United States Patent [19]

Leach

[11] 4,257,519

[45] Mar. 24, 1981

[54] FRICTIONLESS ENTRY AND RELEASE SPROCKET

[76] Inventor: John M. Leach, Box 341, Port Jefferson, N.Y. 11777

[21] Appl. No.: 35,715

[22] Filed: May 3, 1979

[51] Int. Cl.³ .................... B65G 23/06; F16H 55/30
[52] U.S. Cl. .................................. 198/834; 474/153; 474/163; 474/164
[58] Field of Search .......... 74/243 R, 243 C, 243 PC, 74/243 FC, 244, 245 R, 245 C, 255 R, 434, 594.2; 226/76, 81; 198/684, 687, 698, 732, 500, 833, 834

[56] References Cited

U.S. PATENT DOCUMENTS

| | | | |
|---|---|---|---|
| 994,896 | 6/1911 | Willson | 74/244 |
| 1,960,719 | 5/1934 | Stibbs | 74/245 C X |
| 2,913,093 | 11/1959 | Bevan | 226/81 X |
| 2,919,916 | 1/1960 | Davidson et al. | 226/81 |
| 2,931,486 | 4/1960 | Zebarth | 198/684 |
| 3,216,553 | 11/1965 | Leach | 198/500 |
| 3,867,851 | 2/1975 | Gregory et al. | 74/244 |

*Primary Examiner*—C. J. Husar
*Assistant Examiner*—Moshe I. Cohen

[57] ABSTRACT

This invention comprises a machine such as a conveyor having a chain and a powered sprocket for driving the chain. The sprocket comprises a circular main plate, individual chain-contacting teeth around the periphery thereof and each tooth being pivotally connected to the main plate for rotation relative thereto and each tooth having a cam contacting surface. An individual cam-stop is also pivotally mounted on the main plate for rotation relative thereto and adjacent to each tooth and each cam-stop has two cam areas capable of selectively contacting the cam contacting surface on its adjacent tooth, and means for positioning each of said cam-stops so that a cam area thereon will rotate its adjacent tooth towards contact with the chain as the chain enters the sprocket, and so that the other cam area will enable said tooth to rotate so as to release contact with said tooth with said chain at the desired release point between the chain and sprocket. Whereby the contact between the teeth and chain and the release of the sprocket by the chain are both accomplished without any sliding friction between the teeth and chain.

8 Claims, 4 Drawing Figures

FRICTIONLESS ENTRY AND RELEASE SPROCKET

BACKGROUND OF THE INVENTION

Because of the relatively short wear-life of the sprockets in chain and sprocket applications, even when roller chains are used but to a lesser extent compared to non-roller chains, many attempts have been made to improve the sprocket wear-life in numerous ways. One way which has proved very successful is to pivot the teeth on the sprocket and by means of a stationary cam which engages some part of the tooth to gradually move it into contact with a chain link to drive the chain at the entry point of the chain onto the sprocket and then gradually move the tooth away from contact with the chain link at the release point of the chain from the sprocket. In this manner the grinding sliding frictional wear always present when a fixed tooth on a sprocket comes into power transmitting contact with a chain link is completely eliminated. This fixed tooth extreme wear is particularly devasting when the link surface which comes into contact with the tooth is flat because of the characteristics of the particular chain because the sliding friction is thereby greatly increased and the wear-life is thereby greatly reduced.

U.S. Pat. No. 2,931,486 is a typical example of this construction as applied to a corner sprocket and U.S. Pat. No. 1,960,719 is a typical example of this construction as applied to a so-called caterpillar type drive which can be used at any straight section of a chain.

These two patents are believed to represent the closest art to the present invention although U.S. Patent Classification Classes 198—203 and 74—243 include numerous other patents showing this wear reducing feature, any one or more of which may for reasons not now known appeal more to others as being better prior art. Other related classes may also be involved.

SUMMARY OF THE INVENTION

In all of the prior art patents reviewed the construction included a fixed cam and the movable teeth carried by some rotatable element moved around the fixed cam and the inner ends of the movable teeth contacted the cam at a point just as a tooth entered the sprocket and remained in contact with the cam throughout the driving period and then moved off of the cam just as the tooth released from the sprocket.

Although this type of sprocket structure has decreased the rapid wear on both the sprocket teeth and chains, this structure has many negative features.

For example, the necessity to mount the cam 80 of the U.S. Pat. No. 2,931,486 structure in sufficient proximity to the sprocket 48 to enable the movable dogs 68, 70 to contact the cam 80 requires a very complex arrangement, including the use of the dogs 68, 70 in addition to the sprocket teeth 62. This is a very expensive arrangement.

Also, the dogs 68, 70 are in high pressure contact with the cam 80 the entire time that they are in driving contact with the chain. This long friction contact between the dogs 68, 70 and the cam 80 requires the use of rollers 76 to reduce the wear during this long high pressure friction period. This again adds to the expense of this structure.

The sprocket plate 48 has numersous large slots 74 which greatly weakens the sprocket, particularly when used on high chain-pull applications.

The cam 80 is fixed and can not be adjusted to correctly set the exact point for both the entry and release of the chain from the sprocket to fully reduce the friction produced when the sprocket and chain first meet and then later separate.

The same sprocket 48 can not be used for a ninety degree wrap, a one hundred and eighty degree wrap or any other degree wrap except the exact one for which the fixed cam 80 is originally constructed. This greatly increases the sprocket inventory required and the sprocket cost accordingly.

Finally, the sprocket structure disclosed by the U.S. Pat. No. 2,931,486 can not be directly mounted on the usual gear-reducer output shaft, but requires a special base or casing 24 for mounting. This greatly increases the cost of this equipment.

It is an object of the present invention to provide a chain sprocket which is simple in construction, economical to produce, reliable in operation, long wearing, eliminates friction between the chain links and sprocket teeth during the entry of and release of the chain from the sprocket, reduces friction between the sprocket elements during operation to a minimum, and by a simple adjustment can provide any desired wrap on a sprocket.

It is a further object of the present invention to provide a chain sprocket which is smooth in operations even after severe wear on the sprocket and teeth after extensive usage. It is another object of the present invention to provide a chain sprocket which places no bending stress on the chain linkage.

Other objects and advantages will be apparent to those skilled in the art after recourse to the following specification and drawings.

DESCRIPTION OF THE NOW PREFERRED EMBODIMENT OF THE PRESENT INVENTION

The sprocket of the present invention is particularly adapted for use with the chain disclosed by U.S. Pat. Nos. 3,216,553 and 3,250,379 but is not limited to use with chains of that type but can be used with any chain of relatively long pitch.

The sprocket comprises a main plate 10 having notched areas around the periphery as shown at 17, one notch for each tooth. The purpose of these notches is to receive any pusher plates P, see FIG. 2, which may be carried by the chain to move bulk materials along a conveyor.

Figure 2:
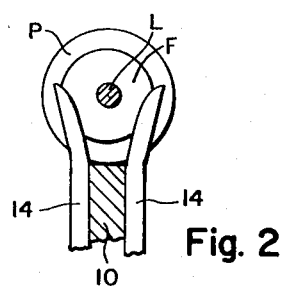
FIG. 2 is a cross sectional view of the sprocket taken on the plane shown by the line 2—2 of FIG. 1 and looking in the direction of the arrows.

Bolts 16 extend through suitable openings in the main plate 10 and fasten teeth 14 to the plate 10, one on each side of the plate 10 as shown in FIG. 2. The threaded portions of the bolts 16 are limited in extent such that the bolt nuts to not tighten down tight against the plate 10 so that the teeth 14 can rotate freely about the bolts 16.

The plate 10 is suitably attached, as by welding, to a hub 12 which is provided with a bore 44 which receives the usual drive shaft, not shown.

Stub shafts 18 extend through suitable openings in the main plate 10 amd each shaft 18 is provided on each end on each side of the main plate 10 with a cam-stop 20. The significance of the term "cam-stop" will be explained later. Each cam-stop 20 is suitably fastened securely to each end of a stub shaft 18 by set screws 22 or any other desired fastening. Each cam-stop 20 is provided with two extending arms 28 and 30 which are suitably securely attached to each cam-stop 20 as by welding. The thickness of each cam-stop is slightly greater than its adjacent tooth 14 so that the arms 28 and 30 can move over the adjacent tooth 14 freely without binding on the tooth. Each cam-stop 20 is provided with two substantially flat faces 24 and 26, each of which is capable of contacting its adjacent tooth 14 at a contacting area 29. The cam-stops 20 are so formed that the face 26 is farther away from the center of rotation of the cam-stop than the face 24.

In the embodiment shown which is particularly designed for driving a conveyor chain of the type shown in the two above mentioned patents, the flights F will rest on the areas 15 of the teeth 14 and the main plate 10 and will be driven by the areas 19 of the teeth as shown in FIG. 2. The areas 19 of the teeth 14 are flared outwardly as shown in FIG. 2 in order to guide the linkages L into position between each of the tooth pairs, as the chain enters the sprocket.

Figure 3:
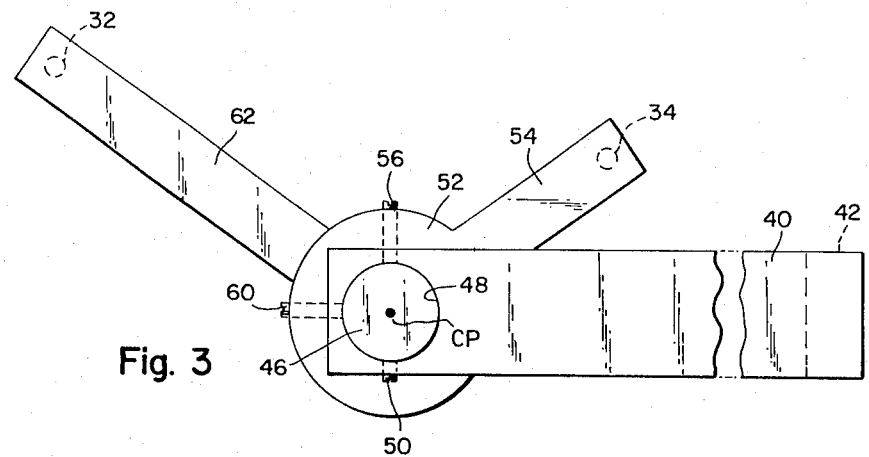
FIG. 3 is a side elevational view of the two cam-stop actuators of the present invention.
Figure 4:
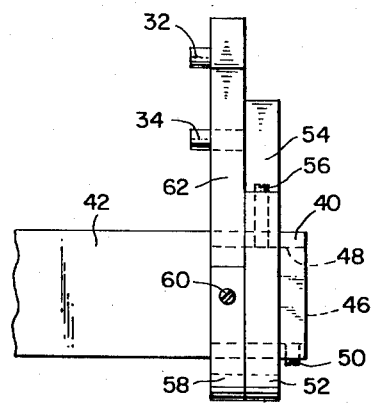
FIG. 4 is a side view of the left side of the two cam-stop actuators, as viewed in FIG. 3.

The FIGS. 3 and 4 show two adjustable position fixed arms 54 and 62 which carry near their outer ends projections 34 and 32, respectively. The arms 54 and 62 are provided with enlarged inner ends 52 and 58, respectively, which are provided with concentric bores which also coincide with a bore 48 in an arm 40. A stud shaft 46 extends through all three of these bores and is held in place in any desired manner as by the set screw 50. The arm 40 is suitably connected as by welding to an arm 42 at the right end of arm 40 as viewed in FIG. 3. The arm 42 is rigidly attached to whatever base (not shown) which ultimately supports the drive shaft which fits into the bore 44 of the sprocket. If the base is movable as when the sprocket also acts as a slack take-up for the driven chain, then the arm 42 and all that it supports will move with the base coextensively. The purpose being to maintain the center of the sprocket bore 44 in exact alignment with the center of the stub shaft 46 so as to maintain a permanent position relationship between the projections 32 and 34 and the nearest sprocket teeth to these projections at any given time.

The arm 54 is held in any angular position to which it is rotated manually by a set screw 56 and the arm 62 is likewise held in any manually adjusted position by a setscrew 60.

It will be noted that there is a cam-stop on each end of each stub shaft 18 but the cam-stops on the left hand side of the main plate 10 do not have arms 28,30 because the two cam stops on each stub shaft are securely fastened to it so that the arms 28,30 on one side of the main plate 10 rotate both cam-stops on a given stub shaft. This enables both teeth 14 on opposite sides of the main plate to be rotated together.

OPERATION

The sprocket of the present invention can be used as a drive sprocket, an idler sprocket or a driven sprocket. Since its operation is identical basically in either capacity only the drive operation will be described.

The drive shaft which fits into bore 44 of the sprocket can be driven by any suitable prime mover well known in the art so that the drive details form no part of the present invention and will not be specifically described herein.

Figure 1:
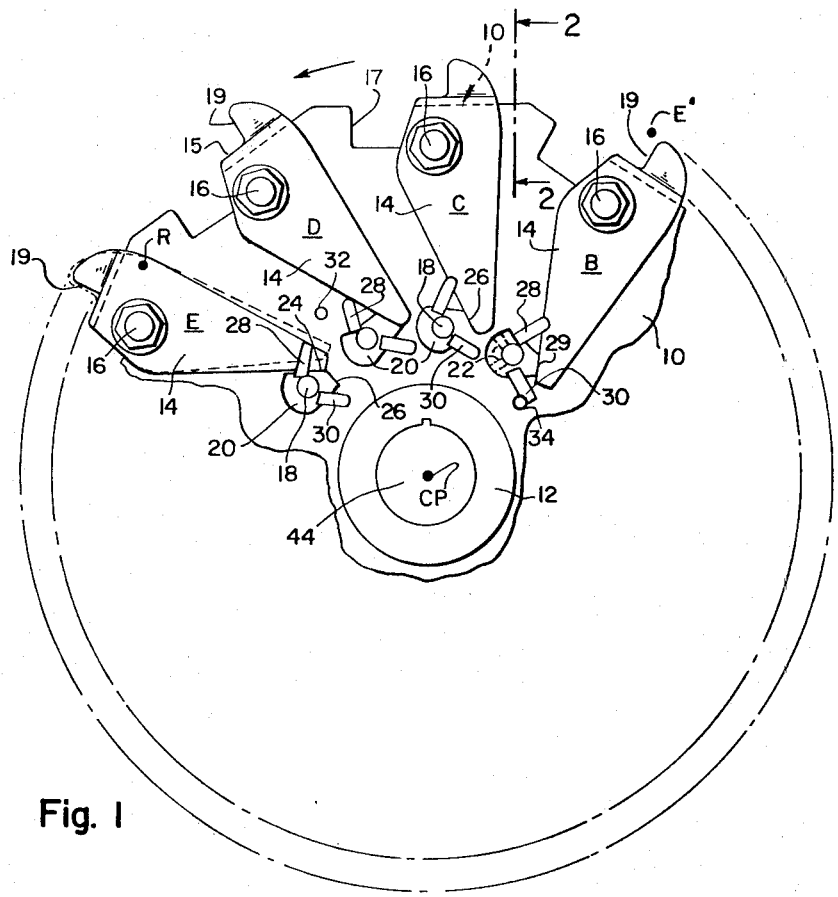
FIG. 1. is a fragmentary side elevational view of the sprocket of the present invention.

The sprocket will rotate in the direction shown by the arrow in FIG. 1, for the purpose of this description only.

The sprocket as shown in FIGS. 1, 3 and 4 is a ninety degree sprocket, that is, only one quarter of the teeth on the sprocket will be in contact with the chain; sometimes called a corner sprocket, or a quarter wrap sprocket. This same sprocket can be quickly adjusted to act as any degree wrap sprocket desired as will be later explained.

Of the four teeth B, C, D and E shown in FIG. 1, B has just been moved forwardly by its cam-stop 20 into chain driving position, or is nearing the "entry point", C and D are in driving position, and D has just been allowed to move backwardly under the driving contact force and is nearing the "release point". The section of each tooth which has just moved in a stated direction is the tooth contacting area 19. What has controlled this individual movement of the teeth B, C, D, and E is the positions of the projection 32 and 34, see FIG. 1, carried by the arms 62 and 54, respectively, see FIGS. 3 and 4.

These arms are suitably supported by the arms 40 and 42, as previously explained, so as to position the projections 32 and 34 as shown in FIG. 1, in which position the center points, marked CP in FIGS. 1 and 3, are in accurate axial alignment.

The arms 40, 42, 54 and 62 have been shown displaced from the sprocket structure in order to open up the view of the cam-stops 20 and their operations which will now be described. It being understood that these arms will be in place with the center points CP of FIGS. 1 and 3 in accurate axially alignment and the arms 54 and 62 angularly adjusted to position the projections 32 and 34 as shown in FIG. 1 where the projections can be contacted by the arms 28 and 30 of the cam-stops 20 as the latter rotate with the sprocket.

In FIG. 1 the teeth B, C, and D are shown in the position in which the driving areas 19 of the teeth are in contact with the chain areas which receive the driving force of the teeth such as the areas F of FIG. 2. In this position the cam-stop tooth contacting areas 26, which are spaced farther from the centers of rotation of the cam-stops and the stub shafts 18 than the cam-stop faces 24, are in contact with the cam-stop contacting areas 29 on the teeth. This position of the teeth holds all through the driving time so that there is no relative movement at all between the tooth areas 19 and the tooth areas F which eliminates all frictional wear on both the chain and sprocket at this time which differs greatly from the above cited prior art in which there is constant frictional wear taking place between the cam and adjacent ends of the teeth all during this high pressure transmitting period.

As the rotation of the sprocket continues an arm 28 of a cam-stop 20 approaches the stationary projection 32 and when the arm 28 contacts the projection 32 the cam-stop to which it is attached will be rotated clockwise which causes the face 26 to break contact with the tooth area 29 and bring the face 24 of the cam stop in position to be contacted by the area 29 on the tooth. Since face 24 is closer to the axis of rotation of the cam-stop 20 there will be a space between the face 24 and the area 29 which enable weight of the tooth longer end and the pressure between the tooth area 19 and the chain area F to rotate the tooth clockwise and break contact between the area 19 on the tooth and area F on the chain. This is the only camming action that ever takes place between the tooth area 29 and the cam-stop 20 while a tooth is driving and under pressure. When the face 24 or face 26 of the cam-stop are in contact with the tooth area 29 the faces 24 and 26 are acting only as stops to hold the tooth in a driving or a non-driving position. Hence the term "cam-stop". This camming action lasts only for a fraction of a second so that no heat is ever generated and almost no wear takes place.

The foregoing action has just taken place on tooth E of FIG. 1. Just before the tooth E reached the chain release point designated R the arm 28 on the cam-stop 20 adjacent to tooth E contacted the projection 32 and rotated the cam-stop into the position shown and the tooth E was moved as above explained into the position shown in solid lines from the position shown in dotted lines. In the solid line position the area 19 of tooth E is no longer in pressure contact with the chain area F so that these two areas move apart as the chain releases from the sprocket with no measurable friction and wear. This is a great difference from a conventional sprocket where the friction between the teeth and chain is terrific under heavy chain pulls so that great wear takes place resulting in a very short wear life for both the chain and sprocket.

The tooth E will retain the released position as the sprocket moves it around until it reaches a position where the arm 30 on its cam-stop 20 contacts the other stationary projection 34 which will cause the cam-stop to rotate counterclockwise as viewed in FIG. 1 and bring the face 26 back into contact with the area 29 of the tooth and thus move the tooth back into driving position so that it will be in the position shown by tooth B. During this action the cam-stop again cams the tooth into a different or driving position but at this point the tooth is not driving so that only the weight of the longer part of the tooth is involved which is at most several pounds and the action again requires only a fraction of a second so that the wear between the tooth area 29 and the cam-stop is insignificant even if measureable.

The driving face of tooth B is then in a position to immediately contact the chain area F at the entry point designated at E' in FIG. 1. This tooth and chain contact will then take place with no sliding friction between the tooth and chain which eliminates all wear at the entry point. This is here again greatly different from conventional sprocket and chain entry coaction where the frictional resistance to movement of the chain into mesh with the sprocket is frequently so great that the chain linkages are actually flexed which results in very rapid fatigue failure of the chain as well as excessive wear on the sprocket teeth.

The movable teeth 14 usually hold the positions to which they are moved by the cam-stops 20 but if the sprocket must operate under conditions where some outside interference may occur, such as having to operate in contact with bulk material being conveyed, small stops can be suitably placed on the main plate 10 to retain the teeth in the desired positions.

It is possible to cause either a later or earlier entry or release or both or any combination desired by adjustment of the angular positions of the arms 54 and 62 to change the positions of the projections 32 and 34 relative to the entry and release point and these elements provide the now preferred means for performing this function.

It is also very quick and easy to set up a sprocket for any desired degree of chain wrap by rotating the arms 54 and 60 to move the tooth positions to accomodate the changed entry and release points.

It is merely necessary to reverse the two side face positions shown in order to reverse the direction of rotation of the sprocket. Also, the cam-stops which carry the arms 24 and 26 can be placed on either side of the main plate in which event the arms 54 and 62 will also have to be placed on the same side as the cam-stop arms 24 and 26.

In using the sprocket of the present invention as an idler or driven sprocket, it will be necessary to reverse the direction of rotation from that shown in FIG. 1 and also reverse the entry and releases points and the positions of the arms 24 and 26 on the cam-stops 20.

The foregoing is to be considered as descriptive and not limitative as many changes, variations and modifications of the structure of the present invention can be made without departing from the substance of the present invention.

The invention having been described, what is claimed is:

1. A machine, such as a conveyor, including a link chain, a sprocket for coaction with said chain and comprising a rotatable circular main plate, teeth for meshing with said chain and being positioned around the periphery of said main plate, each tooth being rotatably attached to said main plate and having an area thereon in position thereon for contact with a cam face so as to be rotated thereby, a cam-stop also rotatably mounted on said main plate adjacent to each tooth and having two cam face areas capable of selectively contacting said cam contacting area on the adjacent tooth, and means for positioning each of said cam-stops so that a cam face will rotate its adjacent tooth into one position as the tooth engages the chain and so that the other cam face will enable said tooth to rotate into a different position as said tooth releases from said chain.

2. A machine such as specified in claim 1 in which the tooth contacting area of said chain is planar.

3. A machine such as specified in claim 1 in which the chain link contacting area of each tooth is planar.

4. A machine as specified in claim 1 in which the chain contacting area for each tooth and the tooth contacting area for each chain link is planar.

5. A machine, such as a conveyor, comprising a chain having spaced sprocket tooth contacting elements, a powered sprocket for driving said chain and including a rotatable main plate, a series of teeth each of which is rotatably attached to said main plate in position to enable the teeth at their outer extremities to seriatim engage said sprocket contacting elements of said chain to propel said chain, individual cam-stops also pivotally attached to said main plate one adjacent each of said teeth to engage and rotate its adjacent tooth in one direction and enable that tooth to rotate in the opposite direction, a stationary projection in position to contact and rotate each of said cam-stops so as to move its adjacent tooth towards a tooth contacting element of said chain as said tooth approaches that contacting element, and a second stationary projection in position to contact and rotate each of said cam-stops in an opposite direction so as to enable said tooth to move away from that contacting element as said tooth approaches the release point from said contacting element.

6. A machine, such as a conveyor, as specified in claim 5 further characterized in that each of said projections is selectively adjustable so as to vary the position of the point at which each of said teeth is moved towards its adjacent contacting element and also vary the position of the point at which each tooth is allowed to move away from its contacting element.

7. A chain sprocket comprising a rotatable main plate, chain meshing teeth rotatably attached to said main plate and positioned around the periphery thereof, cam-stops rotatably attached to said main plate one adjacent each of said teeth and having two cam faces capable of selective contact with its adjacent tooth, means for rotating each of said cam-stops in one direction to enable one of said cam faces to contact its adjacent tooth and rotate it towards a chain as said tooth approaches said chain, and means for rotating each of said cam-stops in the opposite direction to position said other cam face so as to enable its adjacent tooth to move away from said chain as said tooth approaches the release point of said tooth from said chain.

8. A machine such as specified in claim 7 in which each of said projections is mounted on a common base with said rotatable main plate.

* * * * *

UNITED STATES PATENT AND TRADEMARK OFFICE
CERTIFICATE OF CORRECTION

PATENT NO. : 4,257,519
DATED : March 24, 1981
INVENTOR(S) : John M. Leach

It is certified that error appears in the above—identified patent and that said Letters Patent is hereby corrected as shown below:

Column 8, line 12, "7" should read -- 5 --.

Signed and Sealed this

Ninth Day of June 1981

[SEAL]

Attest:

RENE D. TEGTMEYER

Attesting Officer     Acting Commissioner of Patents and Trademarks